Patented June 17, 1952

2,600,698

UNITED STATES PATENT OFFICE 2,600,698

REACTION PRODUCTS FROM AN ALDEHYDE, AN AMINOTRIAZINE, AND A MONO-N-HETEROCYCLIC COMPOUND

Milton J. Scott, Lexington, and Elwood F. Jackson, Ludlow, Mass., assignors to Monsanto Chemical Company, St. Louis, Mo., a corporation of Delaware No Drawing. Application November 13, 1948, Serial No. 59,981

8 Claims. (Cl. 260—67.6)

This invention relates to resins prepared from aldehyde-reactable, resin forming amino compounds, and more particularly, the invention relates to aminotriazine resins modified with pyridine bases.

An object of this invention is to provide a new class of resinous materials.

A further object is to provide modified aminotriazine resins.

Still another object is to provide improved aminotriazine resins especially for use as ion exchange resins.

These and other objects are attained by reacting an aldehyde-reactable, resin-forming amino compound with a pyridine base and an aldehyde.

The following examples are given in illustration and are not intended to limit the scope of this invention. Where parts are given, they are parts by weight.

Example I

A mixture of 63 parts of melamine, 243 parts of formalin (37% formaldehyde), and 320 parts of 2,6-lutidine was reacted at a temperature of about 94 to 99° C. for several hours at a pH of about 8 to 9. The product was then dehydrated under vacuum to yield a clear liquid comprising a soft resin of relatively high molecular weight and a small amount of water. This liquid product was infinitely dilutable with water without precipitating the resin. The liquid was used to increase the wet strength of paper by neutralizing it with hydrochloric acid and applying the neutral liquid to a paper web or adding it to a slurry of cellulose fibers, forming a paper web from the fibers and then curing the resin in the web. A resin pickup of from 3 to 5% by weight was sufficient to cause a substantial increase in the wet strength of the paper.

If desired, the reaction could be carried to the hydrophobe point by longer reaction under alkaline conditions or even to a point where the product was insoluble in hot water. The products of the longer reaction time could be cured to an infusible state by the action of heat and a curing catalyst which might be either acid or alkaline in nature.

Example II

Example I was repeated. The product was not dehydrated, but was allowed to cool to room temperature to obtain a water solution of the soluble resin. To this solution were added 270 parts of 37% hydrochloric acid. During the acid addition, the temperature of the solution rose to about 70° C. and a pH of about 2 was observed. The acidified solution was heated for about 2 hours at 70 to 100° C. when a white precipitate formed. 119 parts of 37% hydrochloric acid and 250 parts of water were then added with vigorous agitation to form a soft white gel. This gel was then broken up, slurried with more water, filtered and dried at 105° C. to obtain a cured resin, which was insoluble and infusible. The solid resin was pulverized, screened, and washed with alkali. The product was a hard, white, insoluble powder.

The white powder thus prepared was evaluated as an anion exchange resin by the standard static evaluation method described by R. J. Meyers et al. in I. E. C., 33, 1270, 1941, using dilute hydrochloric acid as the exhausting agent. The resin was found to have a capacity of 1.32 gram milli-equivalents per milliliter which, when expressed in terms of calcium carbonate, amounts to 29.8 kilo grains per cubic foot. The anion exchange properties could be easily and quickly regenerated by treating the resin with sodium hydroxide or other basic materials.

Example III

A mixture of 4 mols of alpha picoline with 6 mols of formaldehyde was reacted at a pH of about 8 to 9 and a temperature of about 95° C. for about 30 minutes. 1 mol of melamine was then added to the reaction mixture, and the reaction was continued under the same conditions until a hard, white, insoluble gel was obtained. The gel could be comminuted and used as an efficient anion exchange resin.

In place of the melamine shown in the examples, other aldehyde-reactable, resin-forming amino compounds having at least 1 amino group to which at least 1 active hydrogen group is attached may be used. Examples of such compounds are urea, thiourea, dicyandiamide, guanidine, substituted guanidines, thioammeline, aminotriazines including formoguanidine, melam, melem, 2-amino-1,3,5-triazine, triazines wherein one or more of the amino groups are substituted by hydroxy, halogen, alkyl, aryl or aralkyl groups, triazines wherein the hydrogen atoms of the amino groups are partially substituted by amino, alkyl, aryl or aralkyl groups such as 2,4,6-trihydrazine-1,3,5-triazine, 2,4,6-triethyl-triamino-1,3,5 - triazine, 2,4,6-triphenyl - triamino-1,3,5-triazine, etc. Mixtures of the aldehyde-reactable, resin-forming amino compounds may be used.

The aldhyde used may be formaldehyde or other aliphatic, aromatic, or heterocyclic aldehyde such as acetaldehyde, propionaldehyde, butyraldehyde, valeraldehyde, octaldehyde, benzaldehyde, furfural, cinnamaldehyde, crotonaldehyde, etc. Mixtures of two or more aldehydes may be used. The amount of aldehyde used will depend on the number of active hydrogen atoms associated with the particular amino compound being treated. Sufficient aldehyde may be used to react with all of the active hydrogens present, and it is often found convenient to use an excess of aldehyde. For example, with melamine, 6 or more mols of aldehyde may be used per mol of melamine. However, it is within the scope of this invention to use lesser amounts of aldehydes down to about 1 mol per mol of amino compound.

The 2,6-lutidine and the alpha picoline of the examples may be replaced in whole or in part by other pyridine bases pyridine derivatives, and other heterocyclic compounds containing nitrogen in the ring as listed below. The pyridine bases may be defined as compounds derived from pyridine by the substitution of at least one of the hydrogen atoms attached to carbon by an alkyl, aryl, aralkyl, amino, etc., group which contains at least 1 active hydrogen atom. Examples of the pyridine bases which may be used are the picolines, the lutidines, the collidines, the parvulines, the parvolines, ethylcollidine, rubidine, viridine, the amino methyl pyridines including 2-amino-3-methyl pyridine, 2-amino-6-methyl pyridine, etc., 4-amyl pyridine, 2-hexyl pyridine, benzyl pyridine, phenyl pyridine, etc., methyl quinolines, other alkyl quinolines, etc. The amount of pyridine base which may be used depends somewhat on the amount of aldehyde used and the number of active hydrogen atoms on the aldehyde-reactable, resin-forming amino compound used. If the maximum amount of aldehyde is used, the maximum amount of pyridine base may be equivalent on a molar basis to the number of active hydrogen atoms on the amino compound. For example, if 1 mol of melamine is reacted with 6 or more mols of formaldehyde, 6 mols of a pyridine base may be employed. However, it is preferred to use from about 0.5 to about 0.7 mol of pyridine base per active hydrogen atom of the aldehyde-reactable amino compound. Thus, when melamine is the amino compound and 6 mols of formaldehyde are used, from 3 to 4 mols of pyridine base will be employed. However, an excess of the pyridine base may be used and the excess removed at the end of the reaction by distillation.

The reaction between the amino compounds, the aldehyde, and the pyridine base may be carried out simultanously, or the aldehyde may be reacted first with either the amino compound or the pyridine base and the product reacted with the remaining component. If the amino compound is reacted with the aldehyde before the addition of the pyridine base, the reaction may be carried out at a pH above 7 and preferably from about 8 to about 9, at temperatures ranging from 30° C. to 100° C. The pyridine base may then be added to the reaction product and reaction continued under the same conditions, or, if desired, the reaction medium may be made acid with organic or inorganic acids, care being taken to use more acid than is sufficient to form a salt with the pyridine base. Preferably, the reaction between the pyridine base and the other components is carried out at temperatures ranging from 85° C. to 100° C. in order to obtain a stable product which does not break down under subsequent treatment above 80° C.

By varying the duration of the reaction, products having widely different properties may be obtained. For example, by stopping the reaction before the hydrophobe point is reached, a water-soluble, high molecular weight, stable, liquid resin is obtained which is both soluble and fusible. Conversely, by continuing the reaction to the hydrophobe point, a stable, solid resin is obtained which is fusible, but soluble only in hot water. The solid resin has a higher molecular weight than the liquid resin. If desired, the reaction may be carried still further until a stable, solid resin insoluble in hot water is obtained, said resin being at least partially fusible. It is also possible to obtain an insoluble, infusible resin by prolonged heating of the reaction mixture.

The soluble, fusible liquid resin may be used for treating textiles, fabrics, etc. It is preferable for these uses to neutralize the alkaline medium so that a nearly neutral resin may be applied to the desired material. The resins may be cured to an insoluble, infusible state by heat alone or with the aid of an acid or alkaline-curing catalyst. If phophoric acid or an ammonium acid phosphate is used to neutralize the alkaline medium, the resulting liquid resins when impregnated into cloth will flameproof the cloth as well as render it creaseproof and moisture-resistant. When acids are used to neutralize the alkaline conditions, the resultant resins have a strong affinity for paper fibers and will migrate rapidly and become firmly attached to the fibers when added to an aqueous slurry of the fibers in a beater. They do not have to be precipitated on the fibers with acid or acid-reacting substances such as alum, and they may be cured thereon by the application of heat. The resultant paper has unusually high wet and dry strength.

For some applications, it is desirable to have a resin of higher molecular weight, and extreme solubility in water is not necessary. In such cases the resin-forming reaction is carried to the hydrophobe point, the resin is dehydrated, and then used as a dry resin alone or compounded with other conventional ingredients such as dyes, fillers, pigments, lubricants, etc. Such dry, solid resins may be used as molding powders and may be cured under heat and pressure to provide hard, glossy, molded objects.

For use as ion exchange resins, the reaction of this invention is carried to the final stage to obtain a resin completely insoluble in water and infusible. As shown in Example II, this is preferably done by acidifying the reaction mixture and finishing the reaction under acid conditions. By this method, a granular material is obtained which may be used directly as an anion exchange material, or it may be ground to obtain a particular particle size prior to its use in ion exchange processes. The resins show relatively high power of absorption of dilute hydrochloric acid and are easily regenerated with an alkali such as ammonia or sodium hydroxide.

The condensation products of the amino compound with the aldehyde and pyridine base may be rendered more basic and thus more effective for use as an anion exchange resin by a hydrogenation process. The hydrogenation is preferably carried out with nascent hydrogen produced by the action of a strong mineral acid on finely divided metals. Thus, a solid resin prepared as in Example II may be pulverized and thoroughly mixed with a finely divided metal, such as nickel, iron, etc., and then treated with a strong mineral acid, such as hydrochloric acid to produce hydrogen which reduces the resin. A more convenient method for incorporating the finely divided metal in the resin to insure more efficient hydrogenation is to add the finely divided metal to the alkaline reaction medium before a solid resin has been obtained. The reaction is then continued until a solid product containing finely divided metal thoroughly dispersed therethrough results. This product may then be pulverized and treated with a strong mineral acid to hydrogenate the resin.

The condensation products of this invention may be further modified by reaction with alkyl halides to provide quaternary ammonium salts, the salts being then converted into a quaternary ammonium base with alkali. These quaternary ammonium compounds are very strong bases and are extremely efficient as anion exchange resins, being strong enough to remove the weakest of acids from aqueous solutions. For example, a resin made according to Example II may be reacted at about 50° C. with an excess of methyl iodide dissolved in benzene, and the product treated with sodium hydroxide to form the quaternary ammonium base. Other alkyl halides as well as aralkyl halides, aryl halides, tertiary alkyl halides, dimethyl sulfate, etc., may be used to form the quaternary ammonium base. It is also possible and in some cases preferable to form the quaternary derivative of the pyridine base prior to the reaction with the aldehyde and the amino compounds.

It is obvious that many variations may be made in the process and products of this invention without departing from the spirit and scope thereof as defined in the appended claims.

What is claimed is:

1. A stable condensation product comprising the condensation product of 1 mol of melamine, with from 1 to 6 mols of an aldehyde and from 3 to 4 mols of a pyridine base, the condensation reaction having been carried out at 85°–100° C.

2. A stable condensation product comprising the condensation product of 1 mol of melamine, with from 1 to 6 mols of formaldehyde and from 3 to 4 mols of a pyridine base, the condensation reaction having been carried out at 85°–100° C.

3. A stable condensation product comprising the product obtained by reacting 1 mol of melamine with from 1 to 6 mols of formaldehyde and from 3 to 4 mols of 2,6-lutidine at from 85°–100° C.

4. A stable condensation product comprising the product obtained by reacting one mol of melamine with from 1 to 6 mols of formaldehyde and from 3 to 4 mols of alpha picoline at from 85–100° C.

5. A stable condensation product comprising the product obtained by reacting at 85°–100° C. from 1 to 6 mols of an aldehyde with 1 mol of an aldehyde-reactable aminotriazine containing at least one amino group to which is attached at least one active hydrogen atom and from 0.5–0.7 mol of a heterocyclic compound containing a nitrogen atom in the ring per active hydrogen atom on the aminotriazine, and thereafter reducing the product with nascent hydrogen, said heterocyclic compound being taken from the group consisting of alkyl quinolines, pyridine bases and pyridine derivatives in which at least one of the hydrogen atoms attached to a carbon atom of the pyridine ring is substituted by a radical taken from the group consisting of aryl, aralkyl and amino radicals which contain at least one active hydrogen atom.

6. A stable condensation product comprising the product obtained by reacting at 85°–100° C. from 1 to 6 mols of an aldehyde with 1 mol of an aldehyde-reactable aminotriazine containing at least one amino group to which is attached at least one active hydrogen atom and from 0.5–0.7 mol of a heterocyclic compound containing a nitrogen atom in the ring per active hydrogen atom on the aminotriazine, and thereafter reacting the product with an alkyl halide, said heterocyclic compound being taken from the group consisting of alkyl quinolines, pyridine bases and pyridine derivatives in which at least one of the hydrogen atoms attached to a carbon atom of the pyridine ring is substituted by a radical taken from the group consisting of aryl, aralkyl and amino radicals which contain at least one active hydrogen atom.

7. A stable condensation product comprising the product obtained by reacting at from 85°–100° C. from 1 to 6 mols of an aldehyde with 1 mol of an aldehyde-reactable aminotriazine containing at least one amino group to which is attached at least one active hydrogen atom and from 0.5–0.7 mol of a heterocyclic compound containing a nitrogen atom in the ring per active hydrogen atom on the aminotriazine, reacting said condensation product with an alkyl halide followed by further reaction of the product with an alkali to obtain a quaternary ammonium base, said heterocyclic compound being taken from the group consisting of alkyl quinolines, pyridine bases and pyridine derivatives in which at least one of the hydrogen atoms attached to a carbon atom of the pyridine ring is substituted by a radical taken from the group consisting of aryl, aralkyl and amino radicals which contain at least one active hydrogen atom.

8. A stable condensation product taken from the group consisting of (1) condensation products of an aldehyde, a heterocyclic compound containing a nitrogen atom in the ring and an aldehyde-reactable aminotriazine containing at least one amino group to which is attached at least one active hydrogen atom, (2) the hydrogenation products of said condensation products, and (3) the quaternary ammonium derivatives of said condensation products in which the nitrogen of the heterocyclic compound is quaternized, said condensation products having been prepared by condensing one mol of the aminotriazine with from 1 to 6 mols of the aldehyde and from 0.5 to 0.7 mol of the heterocyclic compound for each active hydrogen atom in the aminotriazine, the condensation reaction being carried out at from 85 to 100° C., said heterocyclic compounds being taken from the group consisting of alkyl quinolines, pyridine bases, and pyridine derivatives in which at least one of the hydrogen atoms attached to a carbon atom of the pyridine ring is substituted by a radical taken from the group consisting of aryl, aralkyl and amino radicals which contain at least one active hydrogen atom.

MILTON J. SCOTT.
ELWOOD F. JACKSON.

(References on following page)

REFERENCES CITED

The following references are of record in the file of this patent:

UNITED STATES PATENTS

| Number | Name | Date |
|---|---|---|
| 2,111,698 | Siefert | Mar. 22, 1938 |
| 2,147,789 | Graves | Feb. 21, 1939 |
| 2,192,085 | Kartaschoff | Feb. 27, 1940 |
| 2,197,357 | Widmer | Apr. 16, 1940 |
| 2,209,292 | Berger | July 23, 1940 |
| 2,210,442 | Balle | Aug. 6, 1940 |
| 2,214,067 | Petersen | Sept. 10, 1940 |
| 2,333,623 | Rust | Nov. 2, 1943 |
| 2,433,802 | West | Dec. 30, 1947 |

FOREIGN PATENTS

| Number | Country | Date |
|---|---|---|
| 501,407 | Great Britain | Feb. 24, 1939 |